(12) United States Patent
Altman et al.

(10) Patent No.: US 6,349,361 B1
(45) Date of Patent: Feb. 19, 2002

(54) METHODS AND APPARATUS FOR REORDERING AND RENAMING MEMORY REFERENCES IN A MULTIPROCESSOR COMPUTER SYSTEM

(75) Inventors: Erik Altman, Danbury, CT (US); Kemal Ebcioglu, Katonah, NY (US); Michael Gschwind, Danbury, CT (US); Sumedh Sathaye, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/541,271

(22) Filed: Mar. 31, 2000

(51) Int. Cl.[7] .................................................. G06F 12/00

(52) U.S. Cl. ........................ 711/121; 711/124; 711/145; 711/146

(58) Field of Search ................................. 711/121, 124, 711/145, 146; 712/216, 217, 218, 219, 235

(56) References Cited

U.S. PATENT DOCUMENTS

| | | | |
|---|---|---|---|
| 5,832,205 A | 11/1998 | Kelly et al. | 395/185.06 |
| 5,838,941 A | 11/1998 | Valentine et al. | 395/393 |
| 5,872,990 A | 2/1999 | Luick et al. | 395/800.24 |
| 5,911,057 A | 6/1999 | Shiell | 395/393 |
| 6,011,908 A | 1/2000 | Wing et al. | 395/182.17 |
| 6,081,866 A * | 6/2000 | Grivna | 710/260 |
| 6,205,537 B1 * | 3/2001 | Albonesi | 712/43 |

OTHER PUBLICATIONS

Gschwind et al., "Binary Translation and Architecture Convergence Issues for IBM System/390", ACM Press, Intl Conference on Supercomputing, pp 336–347, 2000.*

Lenoski et al., "The Directory–Based Cache Coherence Protocol for the DASH Multiprocessor", IEEE Computer Architecture, pp 149–159, May 1990.*

Sinharoy et al., "Improving Software MP Efficiency for Shared Memory Systems", IEEE System Sciences, vol. 1, pp 111–120, Jan. 1996.*

Austin, et al., "Zero–Cycle Loads: Microarchitecture Support for Reducing Load Latency", IEEE Proceedings of MICRO–28, Nov. 1995, pp. 82–92.

Lamport, "How to Make a Multiprocessor Computer Than Correctly Executes Multiprocess Programs", IEEE Transaction on Computers, vol. C–28, No. 9, Sep. 1979.

Adve, et al., "Shared Memory Consistency Models: A Tutorial", Tech. Rpt. 9512, Dept. Of Elect. And Computer Eng., Rice University, pp. 1–23, Sep. 1995.

(List continued on next page.)

*Primary Examiner*—Matthew Kim
*Assistant Examiner*—Stephen Elmore
(74) *Attorney, Agent, or Firm*—F. Chau & Associates, LLP

(57) ABSTRACT

There is provided a method for reordering and renaming memory references in a multiprocessor computer system having at least a first and a second processor. The first processor has a first private cache and a first buffer, and the second processor has a second private cache and a second buffer. The method includes the steps of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

25 Claims, 8 Drawing Sheets

OTHER PUBLICATIONS

Postiff, et al., "The Limits of Instruction Level Parallelism in SPEC95 Appliations", Int. Conf. On Architectural Support for Programming Languages and Operating Systems (ASPLOS—VIII), Workshop on Interaction Between Compilers and Computer Architecture, Oct. 1998.

Franklin, et al., "ARB: A Hardware Mechanism for Dynamic Reordering of Memory References", IEEE Transactions on Computers, vol. 45, No. 5, May 1996, pp. 552–571.

Moshovos, et al., "Streamlining Inter–operation Memory Communication via Data Dependence Prediction", IEEE Proc. Of $30^{th}$ Annual Symposium on Microarchitecture Research, Triangle Park, N. Carolina, pp. 235–245, Dec. 1997.

Tyson, et al., "Improving the Accuracy and Performance of Memory Communication Through Renaming", 1997 IEEE Proc. Of $30^{th}$ Annual Symposium on Microarchitecture Research, Triangle Park, N. Carolina, pp. 218–227, Dec. 1997.

Mahlke, et al., "Sentinel Scheduling for VLIW and Superscaler Process", Int. Conf. On Architectural Support for Programming Languages and Operating Systems, (ASPLOS V), MA, USA, pp. 238–247, Oct. 1992.

UNIX Systems for Modern Architectures, Addison Wesley, pp. 285–349, Sep. 1994.

\* cited by examiner

METHODS AND APPARATUS FOR REORDERING AND RENAMING MEMORY REFERENCES IN A MULTIPROCESSOR COMPUTER SYSTEM

BACKGROUND

1. Technical Field

The present invention generally relates to computer processing systems and, in particular, to methods and apparatus for reordering and renaming memory references in a multiprocessor computer system.

2. Background Description

Contemporary high-performance processors rely on superscalar, superpipelining, and/or very long instruction word (VLIW) techniques for exploiting instruction-level parallelism in programs (i.e., for executing more than one instruction at a time). In general, these processors contain multiple functional units, execute a sequential stream of instructions, are able to fetch from memory more than one instruction per cycle, and are able to dispatch for execution more than one instruction per cycle subject to dependencies and availability of resources.

The pool of instructions from which the processor selects those that are dispatched at a given point in time is enlarged by the use of out-of-order execution. Out-of-order execution is a technique by which the operations in a sequential stream of instructions are reordered so that operations appearing later are executed earlier, if the resources required by the later appearing operations are free. Thus, out-of-order execution reduces the overall execution time of a program by exploiting the availability of the multiple functional units and using resources that would otherwise be idle. Reordering the execution of operations requires reordering the results produced by those operations, so that the functional behavior of the program is the same as what would be obtained if the instructions were executed in their original sequential order.

In the case of memory-related operations, a memory store operation stores a datum in memory. A later memory load operation may read this datum from memory, load the datum into a processor register and, as is frequently the case, start a sequence of operations that depend on the datum. When directly bypassing such values from the store operation to a subsequent load operation, a slow main memory access may be substituted by a faster register-to-register access. In addition to using idle resources, the bypassing of such values reduces the critical path (i.e., the sequence of operations which determines the minimum execution time possible for a given code fragment) and reduces the number of memory operations which must be processed by the memory system. An additional performance improvement can be achieved by speculatively executing store operations out-of-order. Other benefits are the ability to reorder multiple store and load references to the same memory location by using a technique referred to as "renaming of memory locations".

In general, there are two basic approaches to implementing out-of-order execution and reordering of results: dynamic reordering and static reordering. In dynamic reordering, the instructions are analyzed at execution time, and the instructions and results are reordered in hardware. In static reordering, a compiler/programmer analyzes and reorders the instructions and the results produced by those instructions when the program is generated, thus the reordering tasks are accomplished through software. These two approaches can be jointly implemented.

To ensure that such operations are performed correctly, there must exist a mechanism to undo speculative memory references. Furthermore, store operations to the same address must be presented to the main memory in original program order.

In a multiprocessor environment, additional restrictions are posed on the ordering of memory operations. To achieve predictable and repeatable computation of programs in a multiprocessor environment, a requirement of 'sequential consistency' is described in the article by L. Lamport, "How to Make a Multiprocessor that Correctly Executes Multiprocess Programs", IEEE Transactions on Computers, C-28 (9), pp. 690–91 (September 1979). The article by Lamport defines a multiprocessor system as sequentially consistent if "the result of any execution is the same as if the operations of all processors were executed in some sequential order, and the operations of each individual processor appear in this sequence in the order specified by its program". For static speculative execution, the order of the original logical program text is authoritative, not the reordered program text, and the compiler and hardware implementation must collaborate to generate an execution equivalent to that original order.

To achieve proper performance while simplifying coherence protocols between multiple processors in a computer system, several relaxations of the above described strictly sequential consistent order are possible. The types of re-ordering which are allowable depend on the memory consistency model guaranteed by a particular implementation. An overview of current and proposed consistency models and their characteristics is provided in the article by S. Adve and K. Gharachorloo, "Shared Memory Consistency Models: A Tutorial", Technical Report 9512, Dept. of Electrical and Computer Engineering, Rice University, Houston, Tex. (September 1995).

Typically, these requirements impose additional restrictions on the order of multiple store operations (even those store operations referring to different addresses), and of load and store operations (executed by the same processor or different processors, and referring to the same address or different addresses) with respect to each other.

While these requirements guarantee the correct operation of programs designed to work in the context of such coherency protocols, they impose limitations on the order of operation as instructions are executed in the processor. To achieve high performance while adhering to processor consistency models, a processor must be able to reorder memory operations internally and bypass results between them, but present the memory operations to the memory system in-order.

Accordingly, it would desirable and highly advantageous to have support for the following features in a high performance memory interface of a multiprocessor computer system implementing out-of-order execution, so as to provide maximum scheduling freedom:

1. The ability to execute store operations out-of-order, but retire them to memory in-order.

2. The ability to speculatively perform store operations, coupled with the ability to undo such store operations transparently (i.e., without influencing the correctness of program execution in a multiprocessor system).

3. The ability to hold multiple store result values for the same memory address, and resolve load references to these values, while at the same time retiring store values in original program order to the memory system.

Some example code sequences will now be given to illustrate the performance impact of implementing the above features in a processor supporting out-of-order execution of store operations.

With respect to the ability to execute store operations out-of-order with respect to each other, consider the following in-order code fragment, where the latency of a multiply (MUL) operation is three cycles, and that of all other operations is 1 cycle.

| | |
|---|---|
| MUL | r3 = r4, r5 |
| ST | r3, 16(fp) |
| LI | r4 = 0 |
| ST | r4, 20(fp) |

The preceding code fragment will execute on a single issue out-of-order processor without out-of-order execution of store operations in 5 cycles as follows:

| | |
|---|---|
| MUL | r3 = r4, r5 |
| LI | r4 = 0 |
| NOP | |
| ST | r3, 16(fp) |
| ST | r4, 20(fp) |

With the capability to perform store operations out-of-order, the processor requires only four cycles using the following schedule:

| | |
|---|---|
| MUL | r3 = r4, r5 |
| LI | r4 = 0 |
| ST | r4, 20(fp) |
| ST | r3, 16(fp) |

With respect to control-speculative execution of store operations, consider the following code fragment:

| | |
|---|---|
| CMPLIcr0, r4, 0 | |
| BTRUEcr0.eq, label | |
| ST | r4, 12(fp) |
| label: | |

If we assume that the branch is predicted to not be taken most of the time, and branch resolution requires 3 cycles from a compare operation to a branch operation using the condition, then the above code requires 5 cycles to execute even if the branch is correctly predicted to not be taken. This is because the store operation cannot be executed speculatively once the branch has been predicted as not taken, since store operations cannot be undone.

In contrast, the store operation could be performed speculatively in a memory system supporting the ability to undo store operations transparently. In such a case, if the branch is predicted correctly, then the above code fragment can execute in 3 cycles on a single issue out-of-order processor.

Finally, to execute store operations to the same address out-of-order and correctly resolve references, consider the following code fragment:

| | |
|---|---|
| DIV | r3 = r4, r5 |
| ST | r3, 12(r8) |
| L | r4, 12(r8) |
| LI | r5, 0 |
| ST | r5, 12(r8) |
| L | r6, 12(r8) |
| AI | r6, 1 |

Similar sequences of load and store operations routinely occur in the presence of function calls, where frequently retrieved parameters corresponding thereto are stored on the stack. For an article describing the serializing effects of stack references, see "The Limits of Instruction Level Parallelism in SPEC95 Applications", Postiff et al., International Conference on Architectural Support for Programming Languages and Operating Systems (ASPLOS-VIII) Workshop on Interaction between Compilers and Computer Architectures (INTERACT-3), October 1998.

Consider the execution of the preceding code fragment with a latency of 5 cycles for the divide instruction (DIV) on a single issue out-of-order processor without the capability to rename store memory references to the same address. The resulting schedule will require 10 cycles to execute:

| | |
|---|---|
| DIV | r3 = r4, r5 |
| LI | r5, 0 |
| NOP | |
| NOP | |
| NOP | |
| ST | r3, 12(r8) |
| L | r4, 12(r8) |
| ST | r5, 12(r8) |
| L | r6, 12(r8) |
| AI | r6, 1 |

With renaming of memory locations and in-order retirement of stored values, the code can be executed in 7 cycles. In the following schedule, multiple live names are indicated in square brackets which denote the order of retirement to the memory subsystem.

| | |
|---|---|
| DIV | r3 = r4, r5 |
| LI | r5, 0 |
| ST | r5, 12(r8) [2] |
| L | r6, 12(r8) [2] |
| AI | r6, 1 |
| ST | r3, 12(r8) [1] |
| L | r4, 12(r8) [1] |

The examples above are not atypical; the necessity to perform store operations in-order with respect to both branches and other store operations degrades performance fairly severely by forcing the sequential execution of operations that could otherwise be executed in parallel. However, such a serialization can be avoided (that is, the load operation can be performed earlier than the store operation) as long as actual processor execution can be decoupled from the sequence of data values presented to main memory and other processors in a multiprocessor environment. Thus, some store operations are performed earlier than other store operations, and speculatively with respect to unresolved branches; load operations can reference such values out-of-order. Moreover, if load references are renamed correctly with respect to multiple store operations to the same address, any operation that depends on the datum loaded out-of-order can also be performed out-of-order.

A brief description of the operation of memory requests in a multiprocessor system will now be given with reference to FIGS. 1–3. FIG. 1 is a block diagram illustrating a simplified multiprocessor computing system 100 with private caches, to which the present invention may be applied. FIG. 2 is a flow diagram illustrating the actions taken upon receiving a memory access request in a multiprocessor environment having a memory hierarchy with private caches, according to the prior art. FIG. 3 is a flow diagram illustrating the actions taken by a processor 106 upon receiving a cache cross-interrogate request from a processor 102, according to the prior art. It is to be appreciated that the method of FIG. 3 is performed by processor 106 in response to step 224 of FIG. 2.

Referring to FIG. 1, multiprocessor computing system 100 includes a central processing unit (hereinafter "processor" or "CPU") 102 operatively coupled to a private cache 104, and a processor 106 operatively coupled to a private cache 108.

A private cache is cache which services memory requests of a single processor. A shared cache services the memory requests of multiple processors. Caches can also be shared with respect to some processors, but private with respect to one or more other processors.

The processor 102 and private cache 104 comprise a node 103 of system 100. The processor 106 and private cache 108 comprise a node 107 of system 100.

It is to be appreciated that more than two nodes may be present in a multiprocessor computer system. Moreover, while private cache 104 and private cache 108 each imply a single cache unit, they are intended to also include a cache hierarchy that includes a plurality of caches (e.g., cache hierarchy 104 and cache hierarchy 108). Nonetheless, a single cache is implied in the remainder of this document for ease of understanding. It is to be further appreciated that a cache may be a shared cache with respect to some processors, and a private cache with respect to other processors. Given the teachings of the present invention provided herein, one of ordinary skill in the related art will be able to contemplate these and similar implementations of the elements of the invention.

Node 103, node 107, a main memory 110, a main memory 112, and input/output (I/O) devices 114 are all operatively coupled to each other through system bus 116. I/O 114 collectively refers to I/O adapters (e.g., video card) and the I/O devices (e.g., monitor) operatively coupled thereto. Main memory 110 and main memory 112 are shared between node 103 and node 107. It is to be appreciated that more elaborate interconection structures may be employed in place of system bus 116.

Referring to FIG. 2, processor 106 maintains control of a plurality of memory locations. Processor 102 accesses one of the plurality of memory locations according to the method of FIG. 2.

The cache controller of processor 102 receives a request for data from processor 102 (step 210). It is then determined whether the request refers to a memory location in private cache 104 of processor 102 (step 212). If the request does not refer to a memory location in private cache 104 of processor 102, then the method proceeds to step 220.

However, if the request refers to a location in private cache 104 of processor 102, then it is determined whether the entry in private cache 104 corresponding to the location has the required permissions (e.g., if a write request has been issued, whether the cache entry is in exclusive ownership mode which allows the write request to proceed, or in shared ownership mode, which only allows read requests to be processed) (step 214). If the entry does not have the required permissions, then the method proceeds to step 220.

However, if the entry has the required permissions, then the request is satisfied from private cache 104 (step 218), and the method is terminated.

At step 220, it is determined, via a cross-interrogate from processor 102 to processor 106, whether the location is resident in private cache 108 of processor 106. If the location is not resident in private cache 108 of processor 106, then the method proceeds to step 232. However, if the location is resident in private cache 108 of processor 106, then the location is requested with the appropriate permissions (via a cross-interrogate), and the method proceeds to step 234 (step 224).

At step 232, the memory location is fetched from main memory, and the method proceeds to step 234. At step 234, the memory location (which was either fetched at step 232 or received (in response to the cross-interrogate) at step 224) is stored in private cache 104, the request is satisfied, and the method is terminated.

Referring to FIG. 3, when processor 106 receives a cross interrogate request from processor 102 (step 310), processor 106 searches a private cache directory to determine whether the request refers to a location in private cache 108 of processor 106 (step 312). If the request does not refer to a location in private cache 108 of processor 106, then the method is terminated (step 314). However, if the request refers to a location in private cache 108 of processor 106, then private cache 108 returns the location to the requesting processor (i.e., processor 102) and the method is terminated (step 316).

3. Problems With the State of the Art

A description of the prior art and deficiencies associated therewith will now be given. For example, an address resolution buffer which supports out-of-order execution of memory operations and memory renaming is described by M. Franklin and G. Sohi, in "ARB: A Hardware Mechanism for Dynamic Reordering of Memory References", IEEE Transactions on Computers, Vol. 45, No. 5, May 1996. At least one problem with this approach is that it does not address multiprocessor issues, since it is limited to uniprocessor implementations.

U.S. Pat. No. 5,911,057, entitled "Superscalar Microprocessor Having Combined Register and Memory Renaming Circuits, Systems, and Methods", issued on Jun. 8, 1999, the disclosure of which is incorporated herein by reference, describes an architecture for renaming memory and register operands in uniform fashion. Memory coherence is based upon snooping memory requests. While this approach is sufficient for the in-order execution of memory operations in a multiprocessor computing system, out-of-order operation may generate incorrect results in a multiprocessor system. U.S. Pat. No. 5,838,941, entitled "Out-of-order Superscalar Microprocessor With a Renaming Device that Maps Instructions From Memory to Registers", issued on Nov. 17, 1998, the disclosure of which is incorporated herein by reference, describes symbolic renaming of memory references. At least one problem with this approach is that it does not address multiprocessor issues, since it is limited to uniprocessor implementations.

U.S. Pat. No. 5,872,990 (hereinafter the "'990 Patent"), entitled "Reordering of Memory Reference Operations and Conflict Resolution via Rollback in a Multiprocessing Environment", issued on Feb. 16, 1999, assigned to the assignee herein, the disclosure of which is incorporated herein by reference, uses a checkpointing and rollback scheme to implement strong memory consistency in multiprocessing systems with shared caches. While shared cache architectures offer a simpler execution model for multiprocessor systems, their scalability is limited by the number of cache ports and a number of physical factors (wire length, wire density, chip size, and so forth). Further, the '990 Patent does not address the issues of a system with private caches.

U.S. Pat. No. 5,832,205 (hereinafter the "'205 Patent"), entitled "Memory Controller for a Microprocessor for Detecting a Failure of Speculation on the Physical Nature of a Component Being Addressed", issued on Nov. 3, 1998, the disclosure of which is incorporated herein by reference, describes a gated store buffer architecture for use in a uniprocessor system. This gated store buffer is used to allow rollback of the architecture state in the presence of error conditions. However, the claimed architecture does not support memory renaming. Further, as stated above, its operation is limited to uniprocessor computer systems.

FIG. 4 is a block diagram illustrating a gated store buffer 410 according to the prior art, namely, U.S. Pat. No. 5,832, 205. The store buffer 410 consists of a queue 412 with three pointers, i.e., a head pointer 414, a gate pointer 416, and a tail pointer 418. The head pointer 414 indicates the starting point of entries in the store buffer 410. Memory data stored in the store buffer 410 between the head pointer 414 and the gate pointer 416 are committed, and form a part of the logical memory image. The gate pointer 416 marks the beginning of uncommitted memory data. The end of such data is marked by the tail pointer 418. Uncommitted data can either be committed in the case of successful operation, or discarded when a rollback occurs.

The architected processor state is modified in conjunction with the commit or rollback of the store buffer architecture. Operation of the store buffer architecture is limited to a particular code generation strategy based on static scheduling at runtime (including a binary translation step) using a described underlying Very Large Instruction Word (VLIW) architecture ("morph host") with support for processor state commitment or rollback. After a rollback, operation is restarted using in-order execution.

While gated store buffers offer desirable properties to achieve high performance implementations, their use has not been possible in a multiprocessor (MP) environment since typical gated store buffer implementations can result in incorrect operation and/or deadlock situations in an MP environment.

The problem surfaces during actions which are to be taken on a cross-interrogate from a requesting processor. When the location requested by a cross-interrogate is found in a gated store buffer, the following actions are possible:

1. Supply the data found in the gated store buffer. This can result in an incorrect value supplied to the other processor if the data in the gated store buffer is later discarded, e.g., due to incorrect speculation. This violates the requirement of transparent execution of incorrectly speculated operations.
2. Ignore the data in the gated store buffer. This violates memory consistency requirements and may result in incorrect operations.
3. Wait for the data in the gated store buffer to be resolved before sending a response to a cross-interrogate request, i.e., either committed to the memory state or revoked from the store buffer. This can result in a deadlock situation.

Consider the following examples, which illustrate the danger of incorrect program execution. The first example is provided to illustrate incorrect operation when a value returned from the store buffer is later revoked.

For the first example, consider the following code fragment corresponding to an in-order sequence in a program, the fragment assuring that the value in location (r8) never contains the value 0:

| Processor 1 | | Processor 2 | |
|---|---|---|---|
| cmpwi | cr0 = r4, 0 | lwz | r2, (r8) |
| btrue | cr0.eq, label | | |
| stw | r4, (r8) | | |
| label: | | | |

Out-of-order execution may generate the following out-of-order sequence:

| | Processor 1 | | Processor 2 | |
|---|---|---|---|---|
| 1 | cmpwi | cr0 = r4,0 | . . . | |
| 2 | gated_stw r4, (r8) | | . . . | |
| 3 | btrue | cr0.eq, label | lwz | r2, (r8) |
| 4 | commit_gated_stores 1 | | . . . | |
| 5 | br | done | . . . | |
| 6 | label: revoke_gated_store 1 | | | |
| 5 | done: | | | |

Consider a case where r4 contains the value 0, and a cross-interrogate request from processor 2 is answered with the value stored by the gated store instruction (instruction 2). Then, instruction 3 on processor 2 receives the value deposited by the gated store buffer (instruction 2 on processor 1). Even if that store instruction is later revoked (instruction 6), the value has already been incorrectly loaded by processor 2 and is used for further processing, leading to incorrect results.

The second example illustrates the incorrect operation of programs in the presence of gated store buffers when data in the gated store buffer is ignored and the original value is supplied on a cross-interrogate. The second example also illustrates how a deadlock situation can occur if the responses to cross-interrogate requests are delayed until data in the gated store buffers have been resolved.

For the second example, consider the following code fragments corresponding to in-order programs executing on two processors. In the second example, it is presumed that register r8 holds the same memory address on both processors. Also, register r9 holds the same value on both processors. Furthermore, registers r8 and r9 refer to distinct, non-overlapping memory locations, and data memory is initialized to contain 0 in both locations:

| | Processor 1 | | Processor 2 | |
|---|---|---|---|---|
| 1 | mulwi | r3, r3, 2 | mulwi | r3, r3, 2 |
| 2 | stw | r3, . . . | stw | r3, . . . |
| 3 | li | r2 = 1 | li | r2 = 1 |
| 4 | stw | r2, (r8) | stw | r2, (r9) |
| 5 | lwz | r4, (r9) | lwz | r4, (r8) |

The programs are based on a well-known test case for coherent memory implementation. To execute correctly, register r4 must contain the value "1" on at least one processor after execution.

Now, consider a program which has been reordered to achieve a better instruction schedule. The program uses the capabilities provided by a gated store buffer to ensure that store results from instruction 2 are retired to memory before the store results from instruction 4.

|  | Processor 1 |  |  | Processor 2 |  |  |
|---|---|---|---|---|---|---|
| 1' | mulwir3, | r3, 2 |  | mulwi | r3, r3, 2 |  |
| 2' | li | r2 = 1 |  | li | r2 = 1 |  |
| 3' | gated_stw | r2, (r8) [2] |  | gated_stw | r2, (r9) [2] |  |
| 4' | lwz | r4, (r9) |  | lwz | r4, (r8) |  |
| 5' | gated_stw | r3, . . . | [1] | gated_stw | r3, . . . | [1] |
| 6' | commit_gated_stores |  | 2 | commit_gated_stores |  | 2 |

In an implementation ignoring data in gated store buffers and supplying a previous data value, both load operations at instruction 4' will be supplied not with the data value deposited by gated store operations at instruction 3'. Rather, the pre-initialized data value of 0 will be supplied to both load operations at instruction 4'. This corresponds to an incorrect execution of the multiprocessor program.

The following third implementation choice, delaying answers to cross-interrogate requests until gated store buffer data is committed which references data in the store buffer, leads to a dead-lock when both processors wait for the results from cross-interrogate requests to resolve the load operations at instruction 4':

|  | Processor 1 |  |  | Processor 2 |  |  |
|---|---|---|---|---|---|---|
| 1' | mulwi | r3, r3, 2 |  | mulwi | r3, r3, 2 |  |
| 2' | li | r2 = 1 |  | li | r2 = 1 |  |
| 3' | gated_stw | r2, (r8) [2] |  | gated_stw | r2, (r9) [2] |  |
| 4' | lwz | r4, (r9) |  | lwz | r4, (r8) |  |
|  | wait for cross-interrogate result for location (r9) |  |  | wait for cross-interrogate result for location (r8) |  |  |
| 5' | gated_stw r3, . . . | [1] |  | gated_stw r3, . . . | [1] |  |
| 6' | commit_gated_stores |  | 2 | commit_gated_stores |  | 2 |

Thus, having demonstrated the inadequacy of gated store buffers and other prior art approaches to reordering and renaming memory references in a multiprocessor environment, it can be seen that there is a need for a better architecture and/or methodology for reordering and renaming memory references in a multiprocessor computer system.

SUMMARY OF THE INVENTION

The problems stated above, as well as other related problems of the prior art, are solved by the present invention, a method and apparatus for reordering memory operations in a processor.

In a first aspect of the invention, there is provided a method for reordering and renaming memory references in a multiprocessor computer system having at least a first and a second processor. The first processor has a first private cache and a first buffer, and the second processor has a second private cache and a second buffer. The method includes the steps of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

In a second aspect of the invention, the method further includes the step of committing at least some of the data in the first buffer to an architected memory state of the computer system, prior to the indicating step, to remove the at least some of the data from the first buffer. The indicating step is performed only when the given datum in the first buffer is not committed.

In a third aspect of the invention, the committing step commits a specified datum to the architected memory state of the computer system when a gated store request corresponding to the specified datum is in-order with respect to all instructions that precede the gated store request.

In a fourth aspect of the invention, the resetting step includes the step of discarding at least some of the data in the first buffer.

In a fifth aspect of the invention, the resetting step includes the step of discarding the given datum from the first buffer and all data stored thereafter.

In a sixth aspect of the invention, the method further includes the step of releasing the cache line when operations referring to the cache line have completed execution in-order.

In a seventh aspect of the invention, the method further includes the step of releasing the cache line, when the datum contained within the cache line is committed to an architected memory state of the computer system in-order or when the datum is discarded from the first buffer.

In an eighth aspect of the invention, the earlier state corresponds to an operation immediately preceding the gated store request that stored the given datum in the first buffer.

In a ninth aspect of the invention, the method further includes the step of generating a snapshot of the earlier state.

In a tenth aspect of the invention, the generating step includes one of the steps of copying contents of registers corresponding to the earlier state, and maintaining a record of incremental state changes from at least one state preceding the earlier state up to the earlier state.

In an eleventh aspect of the invention, the method further includes the step of storing a snapshot of the earlier state in the first buffer.

In a twelfth aspect of the invention, the method further includes the step of storing a snapshot of the earlier state in one of the first processor, the second processor, and a storage device external thereto. A timestamp corresponding to the snapshot of the earlier state is stored in the first buffer in association with the given datum.

In a thirteenth aspect of the invention, the resetting step includes the step of searching for the timestamp in the first buffer to identify the snapshot from among a plurality of snapshots stored in one of the first processor, the second processor, and the storage device external thereto.

In a fourteenth aspect of the invention, the method further includes the step of processing the store and load requests in-order and suspending the steps involving the first buffer, upon performing a predetermined number of resetting steps.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
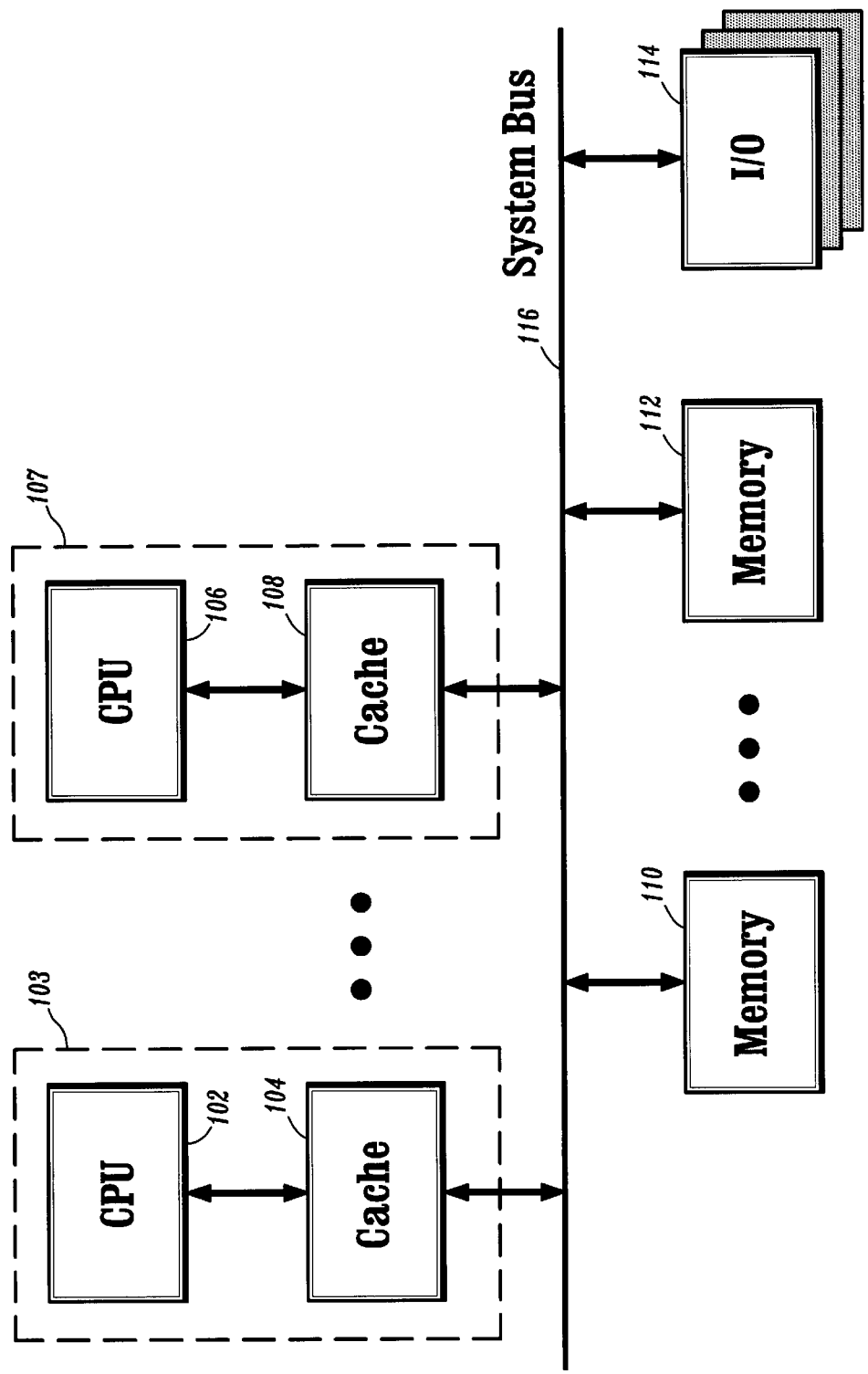
FIG. 1 is a block diagram illustrating a simplified multiprocessor computing system with private caches, to which the present invention may be applied.

The present invention is directed to methods and apparatus for reordering and renaming memory references in a multiprocessor computer system. In such a system, sequences of instructions are stored in a memory for execution by a plurality of processors (i.e., two or more). The invention is applicable to operations reordered when the program is generated (static reordering) as well as to operations reordered at execution time (dynamic reordering). Further, the invention is suitable for software and/or hardware based implementations.

To facilitate a clear understanding of the present invention, definitions of terms employed herein will now be given. A load instruction refers to any instruction performing a memory read-access and (optionally) computations based on the loaded value. Thus, a load instruction may include, for example, logic, arithmetic and other instructions which employ data from memory locations as operands. Out-of-order execution is a technique by which the operations in a sequential stream of instructions are reordered so that operations appearing later are executed earlier, if the resources required by the later appearing operations are free. Thus, an out-of-order load instruction may be created, either statically or dynamically, by moving a load instruction from its original position in a sequence of instructions to an earlier position in the sequence of instructions. Such out-of-order load instruction identifies a location in memory from which to read a datum, and a first destination register in which to place the datum. An ambiguous memory reference refers to the case when a memory load operation appears after another memory load operation in a sequential instruction stream, and it is not possible to determine prior to execution of the program whether the memory locations to be accessed by the two memory load operations are different. A speculative operation (e.g., a memory reference) is an out-of-order operation that may not necessarily be executed because, for example, the execution path in which it is located may not be followed but rather, another execution path may be followed instead. A cross-interrogate is a protocol action whereby a first processor cache checks whether a specific cache line is resident in at least one other processor's cache in a multiprocessor system. In this context, a cross interrogate request can refer to such test in either a bus-snooping or a directory-based implementation of cache consistency. A snapshot is a record of the processor state at a particular execution point.

The following description and corresponding examples will be given based on two instructions (unless otherwise noted), a first instruction which is executed out-of-order before a second, logically preceding instruction, which will be termed an in-order instruction. Thus, unless otherwise noted, the designation 'in-order' refers only to the sequential relationship between the logically preceding in-order instruction and the first 'out-of-order' instruction. It is to be noted that the above two instructions (i.e., both the in-order and the out-of-order load instructions) may be in-order or out-of-order with respect to a third instruction (and so forth).

It is to be understood that the present invention may be implemented in various forms of hardware, software, firmware, special purpose processors, or a combination thereof. It is to be further understood that, because some of the constituent system components and method steps depicted in the accompanying figures are preferably implemented in hardware, the actual connections between the system components (or the process steps) may differ depending upon the manner in which the present invention is programmed.

A general description of the present invention will now be provided to introduce the reader to the concepts of the invention. Subsequently, more detailed descriptions of various aspects of the invention will be provided.

In general, the present provides a method and apparatus for implementing memory operation reordering in a multiprocessor system. A memory system implementing the present invention can support speculative execution of memory store operations, arbitrary reordering of memory store operations with respect to each other, and the ability to support correct resolution of memory load references in the presence of multiple outstanding store operations to a single memory address ("memory renaming"). The present invention is based on buffering memory write operations until the correctness of operations is assured and then committing data to memory in-order in a memory reorder and rename buffer (MRRB) described hereinbelow.

Error conditions (such as speculating across memory barriers, or resource allocation conflicts between multiple processors) are resolved using a rollback/commit scheme. In the absence of errors or resource conflicts, the contents of the memory buffer are committed to memory in-order. When an error condition is detected, the memory buffer is partially or completely discarded and the processor state is reset to an earlier state ("rollback"). When a resource conflict has been detected, one or both processors perform the rollback operation.

The present invention includes embodiments compatible with existing protocols and other embodiments based on an extended set of protocols.

The memory reorder and rename buffer (MRRB) is a device which allows store operations to be executed out-of-order with respect to each other, and with respect to control-flow altering instructions (e.g., branch instructions).

To perform these capabilities, the MRRB performs the following functions:

1. Receives gated store requests, which may be out-of-order with respect to each other. A gated store refers to either an out-of-order store which is not committed until the in-order point of the store operation, or a conditional store which may later be annulled. A gated store request is a request from the CPU to perform a gated store operation in the MRRB.

2. Optionally, satisfies load requests by supplying data values equivalent to an in-order execution sequence of load and store operations, or, optionally, indicates an error condition if ambiguous loads are moved out-of-order with respect to store requests.

3. Supports the capability to commit the values to memory in-order in response to a first control signal.

4. Supports the capability to discard one or more values from the MRRB in response to a second signal.

5. Takes actions to ensure memory consistency in response to cross-interrogate requests from other processors (those not associated with the MRRB to which the request is made) when the other processors request memory locations currently controlled by the MRRB.

According to the present invention, MRRBs are adapted for use with multiprocessor systems by enhanced synchronization actions which are taken when a cache cross-interrogate finds a requested location in the MRRB. Since waiting for a value to be released (committed) by the MRRB can cause deadlock situations to occur, waiting for a commit on a speculative value is not possible.

The present invention therefor is based on synchronizing MRRB contents by rolling back execution to a previous, well-defined state. This eliminates the possibility of a deadlock (since there is no waiting for processor resources).

It is to be appreciated that an MRRB according to the present invention may be implemented as any type of storage device, such as, for example, a buffer, cache, and so forth. It is to be further appreciated that the MRRB may be a stand alone storage device or the MRRB may be included in an existing storage device such as a cache or processor register(s). In the latter case, the MRRB, while included in the existing device, nonetheless operates in a stand alone mode with the respect to operations conducted in the existing device. Thus, for example, if an MRRB is implemented in an existing private cache (or register(s)) of a particular processor, the portion of the cache or register(s) in which the MRRB operates is independent of the operations of the cache as if the MRRB where a separate entity from the private cache. Alternatively, some cross-functionality may be implemented between the MRRB and the storage device. Given the teachings of the present invention provided herein, one of ordinary skill in the related art will be able to contemplate these and similar implementations of the elements of the invention.

The present invention is preferably used with a memory consistency scheme which allows a private cache to obtain exclusive ownership of memory locations for write-access. Multiprocessor coherence protocols are described by Curt Schimmel, in "Multiprocessor Systems with Caches", Unix Systems for Modern Architectures, Addison-Wesley, pub., Reading, Mass. 1994.

According to the present invention, when a gated store request is received by a processor, the corresponding memory location is acquired in exclusive access (write) state by the private cache of the processor. The data value for the memory location is then maintained in the MRRB, while ownership of the corresponding memory line is retained by the private cache until the data value is removed from the MRRB, either by retiring the data value in-order to the memory hierarchy, or by discarding the data value from the MRRB.

In addition, for any data value maintained in the MRRB, the processor must retain at least one processor state snapshot preceding the instruction which deposited the value in the MRRB. This is required to allow "backing out" of any gated store operation by removing the corresponding value (and all values entered in the MRRB thereafter) from the MRRB, and resetting the processor state.

According to the present invention, processors with private caches implementing MRRB capabilities acquire exclusive control of memory locations for which gated store requests have been issued.

A description of various modes for operation of an MRRB according to an illustrative embodiment of the present invention will now be given.

In a first mode of operation, the MRRB receives a request to store a value into a memory location from a processor. The processor acquires exclusive access rights to such location, and then caches the gated store request in temporary memory. Memory locations requested by the MRRB may not be surrendered by the cache hierarchy in response to protocol requests. Such requests will be handled by enhanced control logic described below.

In a second mode of operation, the MRRB receives a load request. If a matching location is found in the MRRB, then the MRRB may optionally bypass information as appropriate to guarantee correct execution of the program. This can include the action of selecting from more than one cached store request, based upon the in-order sequence of the load and store operations. Alternatively, an MRRB may optionally compare the data address of a load operation with the addresses of one or more gated store values and indicate address aliasing conditions which may lead to incorrect operation of a program with reordered memory operations.

In a third mode of operation, the MRRB receives a request to commit part or all of its contents to memory. This is usually triggered by in-order retirement logic of the processor. In response, the MRRB retires the stored data values to the memory hierarchy in original program order. In addition, the MRRB gives up control of the corresponding memory locations, which can now be shared with, or surrendered to, other processors in a multiprocessor system in response to protocol requests.

In a fourth mode of operation, the MRRB receives a request to discard one or more values from the MRRB. This is usually triggered by a rollback of speculatively executed instructions in the processor, e.g., after a mispredicted branch. The MRRB may surrender control of the corresponding memory location.

In a fifth mode of operation, a processor node incorporating a private cache and an MRRB receives a cross-interrogate request for a memory location. If the MRRB contains the address which is the subject of the request, at least one of the MRRBs in either the data requester (i.e., the processor which is trying to access data), or the data owner (i.e., the processor which has exclusive control of the memory location and currently maintains a value in the MRRB) is forced to discard the contents of the MRRB and roll back its processor state to an earlier snapshot which corresponds to an empty MRRB.

A description of a method/apparatus for reordering and renaming memory references in a multiprocessor computer system according to an illustrative embodiment of the present invention will now be given. The method/apparatus is compatible with existing system bus protocols, i.e., a processor implementing the method/apparatus can be integrated in existing computer designs.

The processor contains an MRRB which performs reordering and/or renaming of memory references. When a memory location is first processed for inclusion in the MRRB, the processor obtains the "containing" cache line and maintains ownership of the cache line until all MRRB entries which refer to memory locations contained in this line can be committed to memory in-order. For every cache line requested, a snapshot of the architected processor state is made such that the snapshot captures the processor state prior to processing the current request.

It is to be appreciated that it is not necessary to make a snapshot for every request. The only requirement is that there be a snapshot preceding the current request which captures the processor state such that a successful rollback can be performed. A single snapshot corresponding to the state of the processor with an empty MRRB is sufficient.

Figure 3:
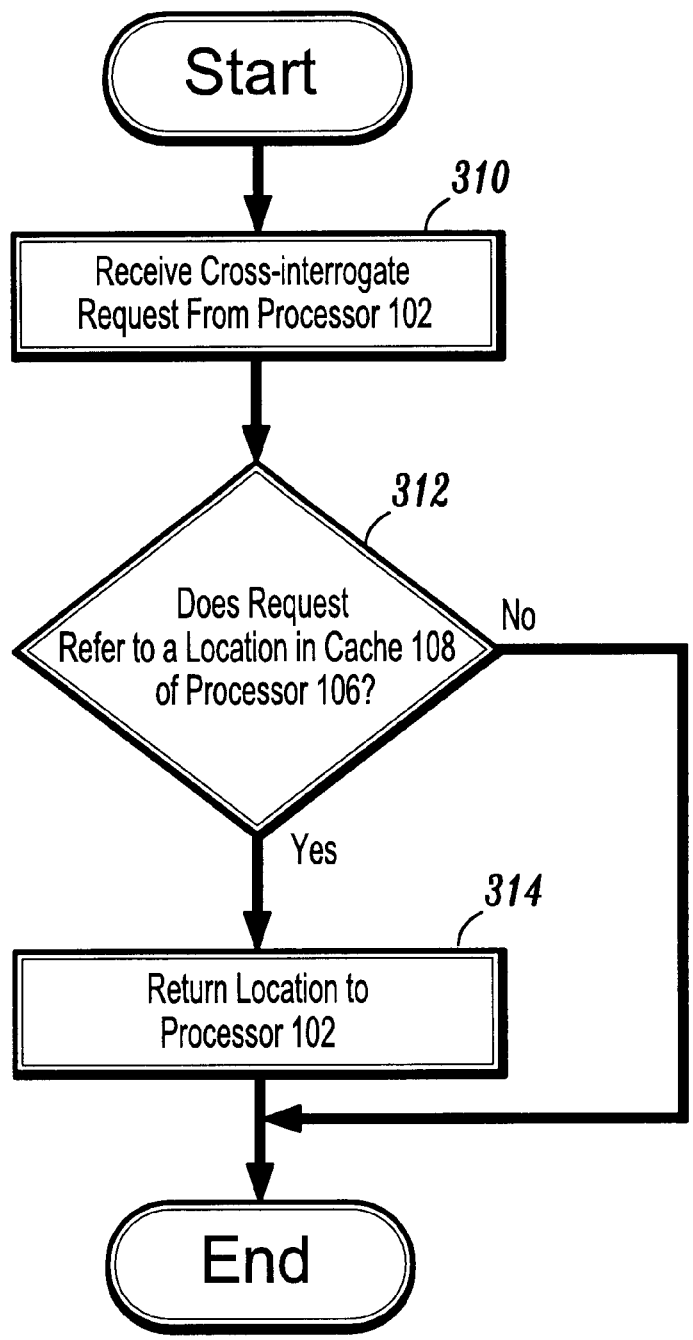
FIG. 3 is a flow diagram illustrating the actions taken by a processor 106 upon receiving a cache cross-interrogate request from a processor 102, according to the prior art.
Figure 4:
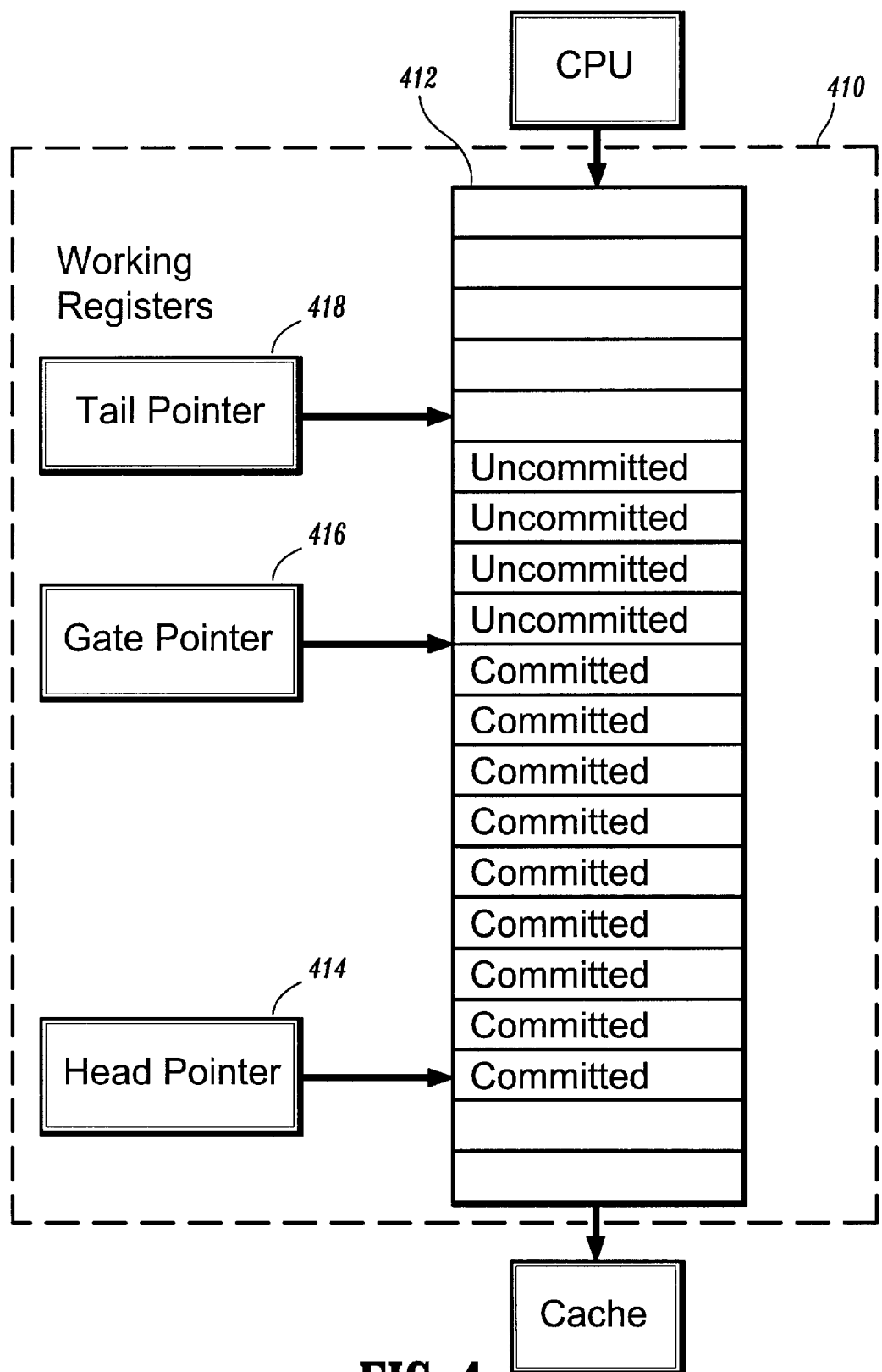
FIG. 4 is a block diagram illustrating a gated store buffer, according to the prior art.
Figure 5:
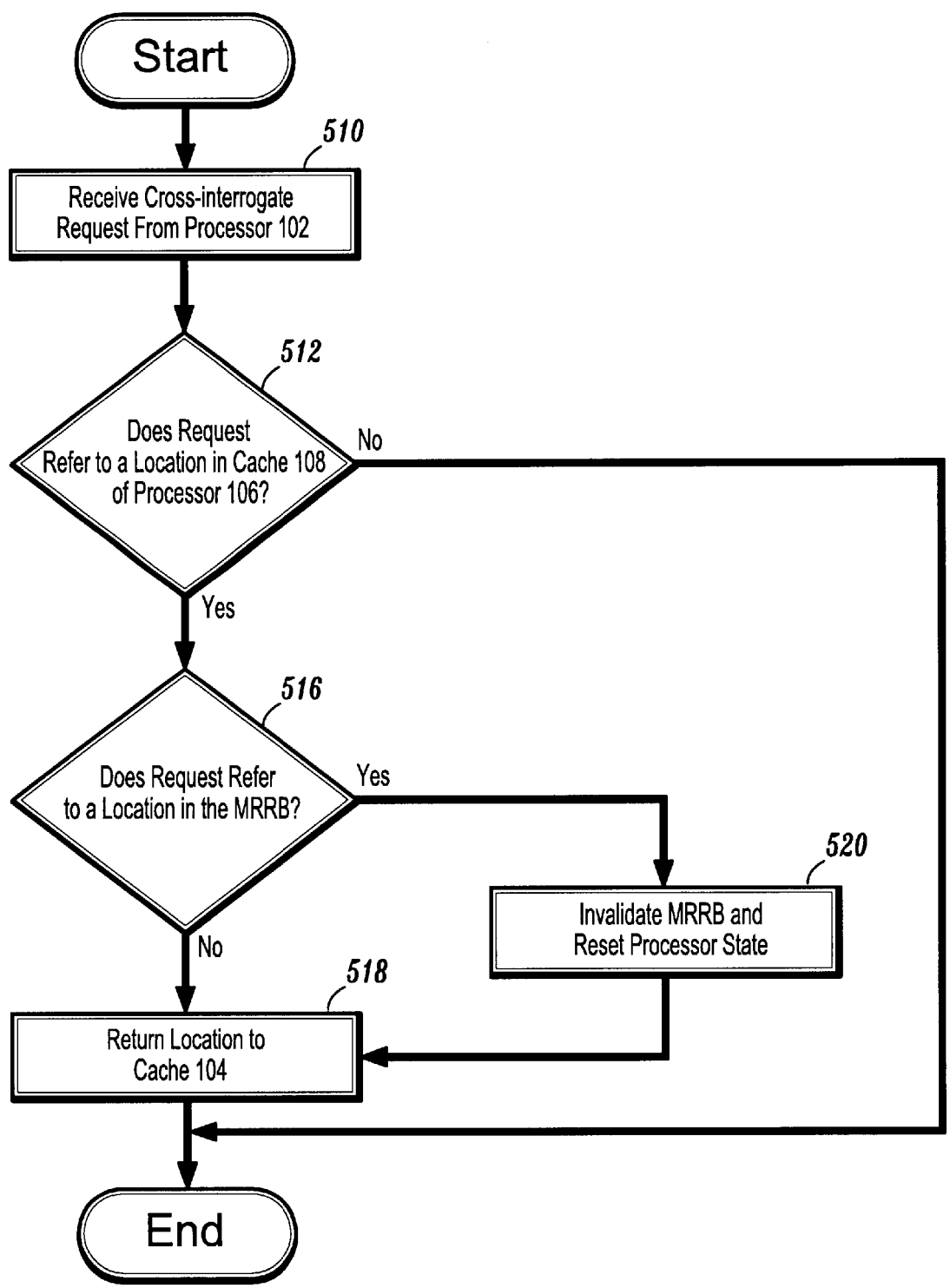
FIG. 5 is a flow diagram illustrating the actions taken by a processor 106 upon receiving a cache cross-interrogate request from a processor 102, according to an illustrative embodiment of the present invention.

When processor 106 requests a data item according to FIG. 3, processor 102 processes a cross-interrogate request according to FIG. 5. FIG. 5 represents an augmented processing capability of cross-interrogates in accordance with the present invention. For illustrative purposes, a cross interrogate can either be in the form of an explicit request in a directory-based coherence protocol, or a snoop action in a bus protocol with snooping. However, other forms of cross-interrogates may be used in accordance with the present invention.

Snooping refers to a bus-based coherence protocol. In this protocol, each node monitors the system bus for requests from other processors. When a node identifies a request from another node for a memory location it currently maintains in its own cache, coherence actions are performed.

Figure 2:
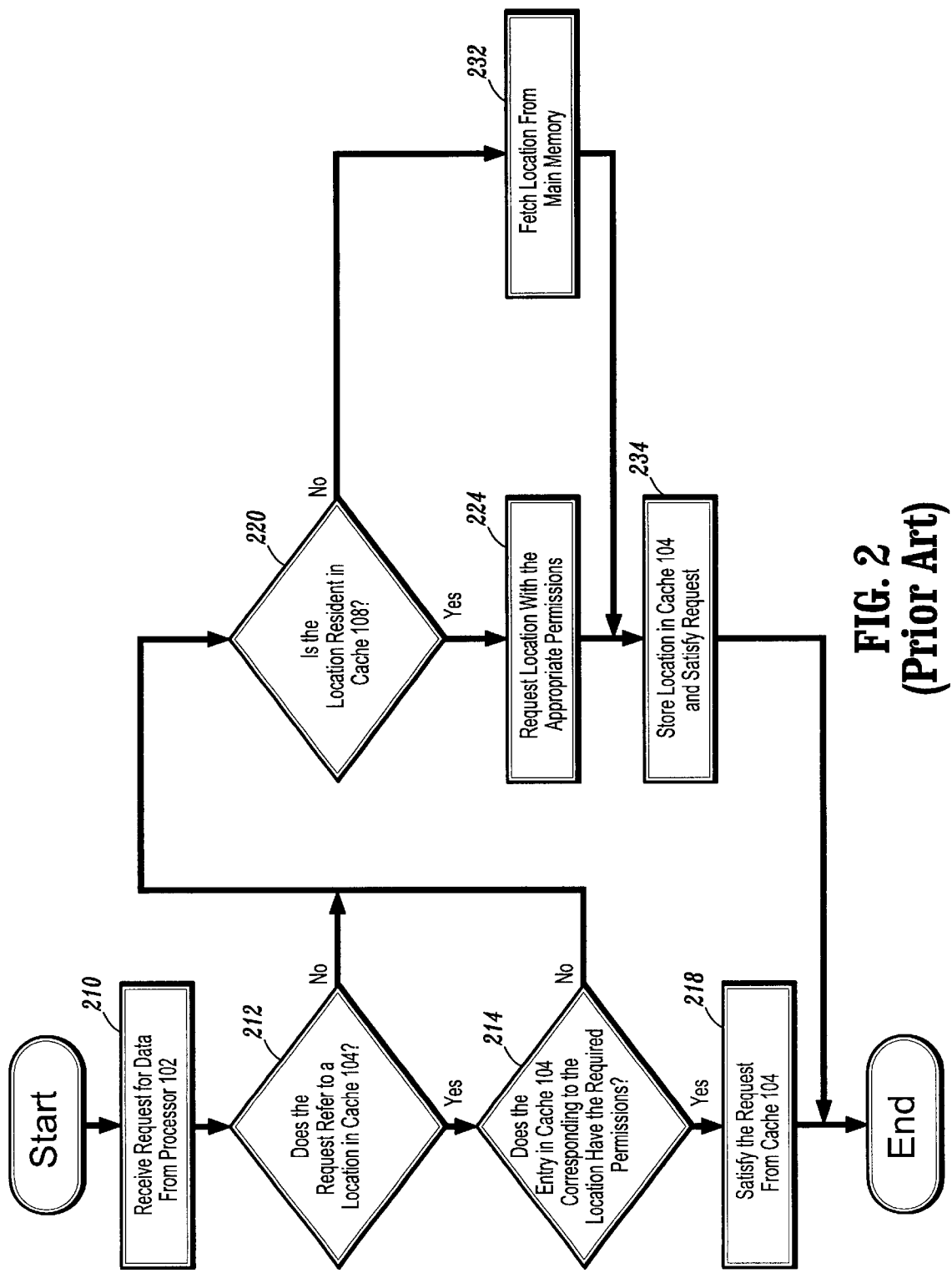
FIG. 2 is a flow diagram illustrating the actions taken upon receiving a memory access request in a multiprocessor environment having a memory hierarchy with private caches, according to the prior art.

FIG. 5 is a flow diagram illustrating the actions taken by a processor 106 upon receiving a cache cross-interrogate request from a processor 102 according an illustrative embodiment of the present invention. It is to be appreciated that the method of FIG. 5 is performed (by processor 106) in response to step 224 of FIG. 2. Accordingly, step 224 is considered a protocol action and the output of the method of FIG. 5 is considered a protocol answer. Processor 106 described with respect to FIG. 5 is presumed to be a processor that is compatible with existing bus protocols. That is, the protocol action and protocol answer between the two processors are the same as in the prior art. This allows the re-use of bus infrastructure from previous systems, and the mixing of standard processors and processors with enhanced capabilities according to the present invention.

When processor 106 receives a cross interrogate request from processor 102 (step 510), processor 106 searches a private cache directory to determine whether the request refers to a location in the private cache 108 (including the MRRB) of the processor 106 (step 512). If the request does not refer to a location in the private cache hierarchy of processor 106, then the method is terminated.

However, if the request refers to a location in the private cache hierarchy of processor 106, then the MRRB is searched to determine whether the request refers to a location in the MRRB (step 516). Note that the search step (step 516) can be omitted, if an indication flag is added to the cache directory. If the request does not refer to a location in the MRRB, then private cache 108 gives up (surrenders control of the requested item according to the method of the bus protocol being used) the requested item in response to the cross-interrogate request and performs whatever protocol actions necessary to transfer control to the requesting cache (i.e., private cache 104) (step 518). However, if the request refers to a location in the MRRB, then, to ensure memory coherence without the possibility of a deadlock, the MRRB is invalidated and processor 106 performs a rollback action by resetting the processor state to a prior snapshot (step 520). Once the state has been rolled back, the entries remain in private cache 108, but have not been modified. The entries can then be given up as necessary to fulfill cross-interrogate requests.

Note that the entire MRRB is not necessarily discarded. A partial rollback is possible by discarding only the found entries and all later entries (i.e., entries recorded after the time corresponding to the earliest found entry), and by rolling back to the state immediately preceding the current entry. This involves tradeoffs as to the complexity of the rollback logic and the number of snapshots maintained.

Figure 6:
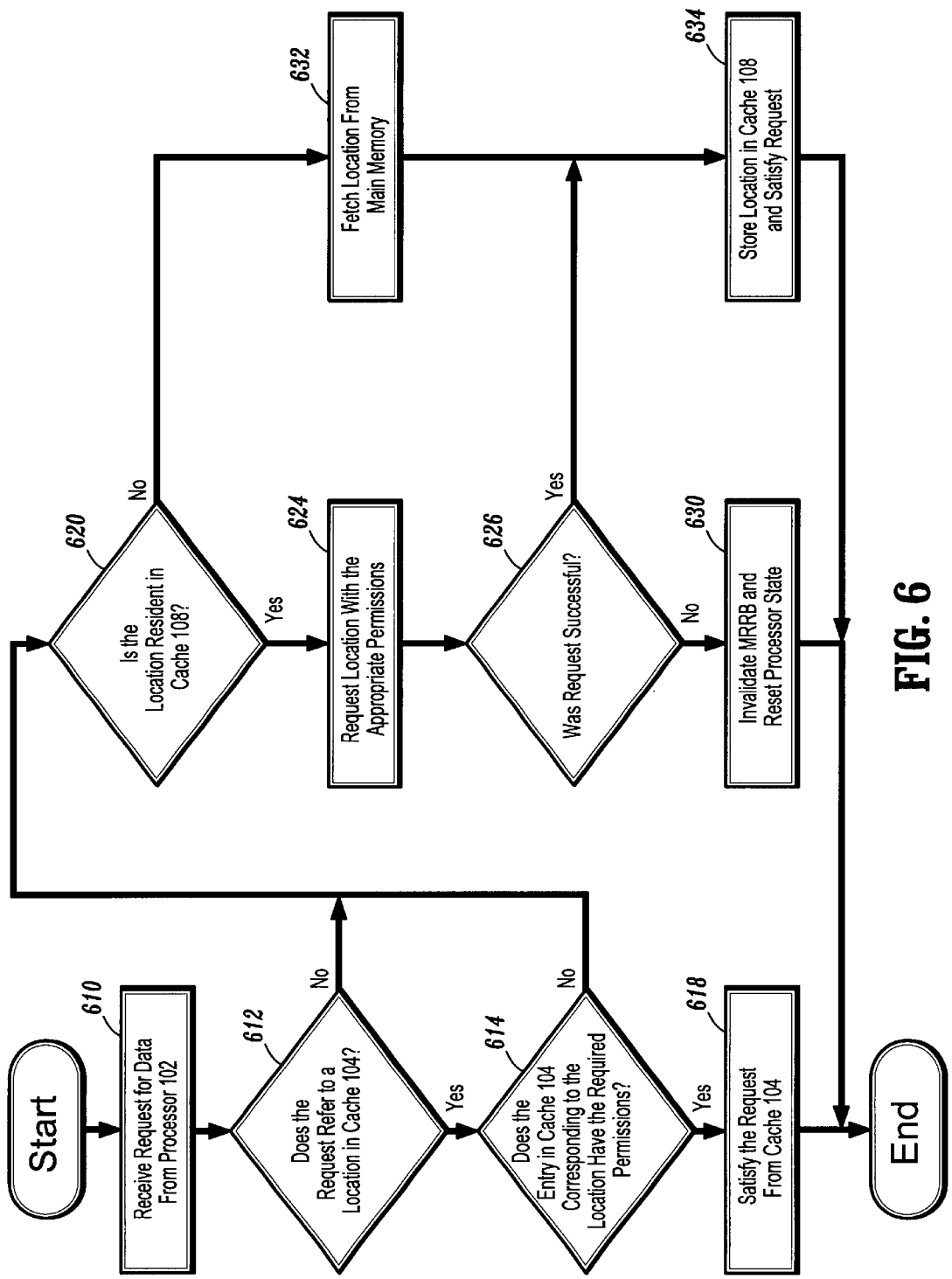
FIG. 6 is a flow diagram illustrating the actions taken by a cache controller of a private cache 104 upon receiving a memory access request from a processor 102 in a memory hierarchy with private caches corresponding to a multiprocessor environment, according to an illustrative embodiment of the present invention.

FIG. 6 is a flow diagram illustrating the actions taken by the cache controller of private cache 104 upon receiving a memory access request from processor 102 in a memory hierarchy with private caches corresponding to a multiprocessor environment according to an illustrative embodiment of the present invention. In the embodiment of FIG. 6, the processors are presumed to have a modified bus protocol. The modified bus protocol can be based on an existing bus protocol, with an additional protocol response indicating a processor's refusal to give up a processor line in response to a cross-interrogate request.

Processor 106 maintains control of a plurality of memory locations in its MRRB. Processor 102 accesses a memory location according to the method of FIG. 6.

The cache controller of processor 102 receives a request for data from processor 102 (step 610). It is then determined whether the request refers to a location in private cache 104 of processor 102 (step 612). If the request does not refer to a location in private cache 104 of processor 102, then the method proceeds to step 620.

However, if the request refers to a location in private cache 104 of processor 102, then it is determined whether the entry in private cache 104 corresponding to the request has the required permissions (i.e., if a write request has been issued, whether the cache entry is in exclusive ownership mode which allows the write request to proceed, or in shared ownership mode, which only allows read requests to be processed) (step 614). If the entry does not have the required permissions, then the method proceeds to step 620. However, if the entry has the required permissions, then the request is satisfied from private cache 104 (step 618), and the method is terminated.

At step 620, it is determined, via a cross-interrogate, whether the location is resident in private cache 108 of processor 106. If the location is not resident in private cache 108 of processor 106, then the method proceeds to step 632. However, if the location is resident in private cache 108 of processor 106, then the location is requested with the appropriate permissions (via a cross-interrogate) (step 624). It is then determined whether the request was successful (step 626). If the request was successful, then the method proceeds to step 634 (step 628). However, if the request was not successful, then the MRRB of processor 102 is invalidated and processor 102 is restored based on a snapshot corresponding to the architected processor state prior to the first MRRB request (step 630), and the method is terminated.

At step 632, the memory location is fetched from main memory, and the method proceeds to step 634. At step 634, the memory location (which was either fetched at step 632 or received in response to the cross-interrogate at step 624) is stored in private cache 108, the request is satisfied, and the method is terminated.

Figure 7:
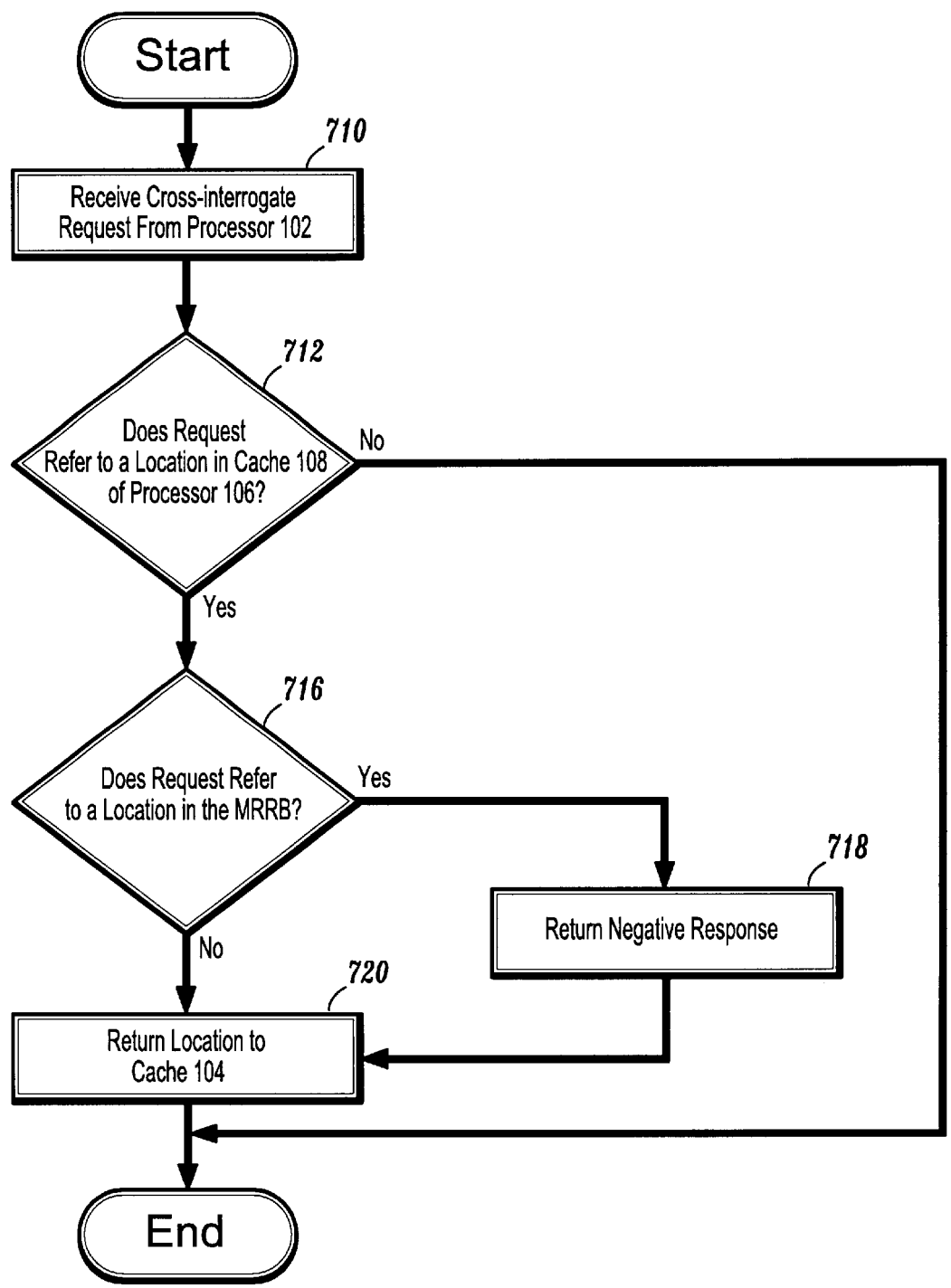
FIG. 7 is a flow diagram illustrating the actions taken by a processor 106 upon receiving a cache cross-interrogate request from a processor 102, according to another illustrative embodiment of the present invention.

FIG. 7 is a flow diagram illustrating the actions taken by processor 106 upon receiving a cache cross-interrogate request from processor 102 according to the illustrative embodiment of FIG. 6. It is to be appreciated that the method of FIG. 7 is performed (by processor 106) in response to step 614 of FIG. 6. Accordingly, step 614 is considered a protocol action and the output of the method of FIG. 7 is considered a protocol answer. In the embodiment of FIG. 7, the processors are presumed to have a modified bus protocol as in FIG. 6. That is, the protocol answer has been augmented to indicate that processor 106 (of FIG. 7) does not give up control of the requested memory location to the requesting processor (processor 102 of FIG. 6).

Upon processor 106 receiving a cross interrogate request from processor 102 (step 710), processor 106 searches its private cache directory to determine whether the request refers to a location in its private cache 108 (step 712) If the request does not refer to a location in private cache 108 of processor 106, then the method is terminated.

However, if the request refers to a location in private cache 108 of processor 106, then the MRRB of processor 106 is searched to determine whether the request refers to a location in the MRRB (step 716). If the request refers to a location in the MRRB, then processor 106 refuses to give up the request line and indicates this by returning a negative protocol response to the requesting processor (i.e., processor 102) (step 718). However, if the request does not refer to a location in the MRRB, then private cache 108 gives up the requested item in response to the cross-interrogate request and performs whatever protocol actions are necessary to transfer control to the requesting cache (i.e., private cache 104) (step 720).

Figure 8:
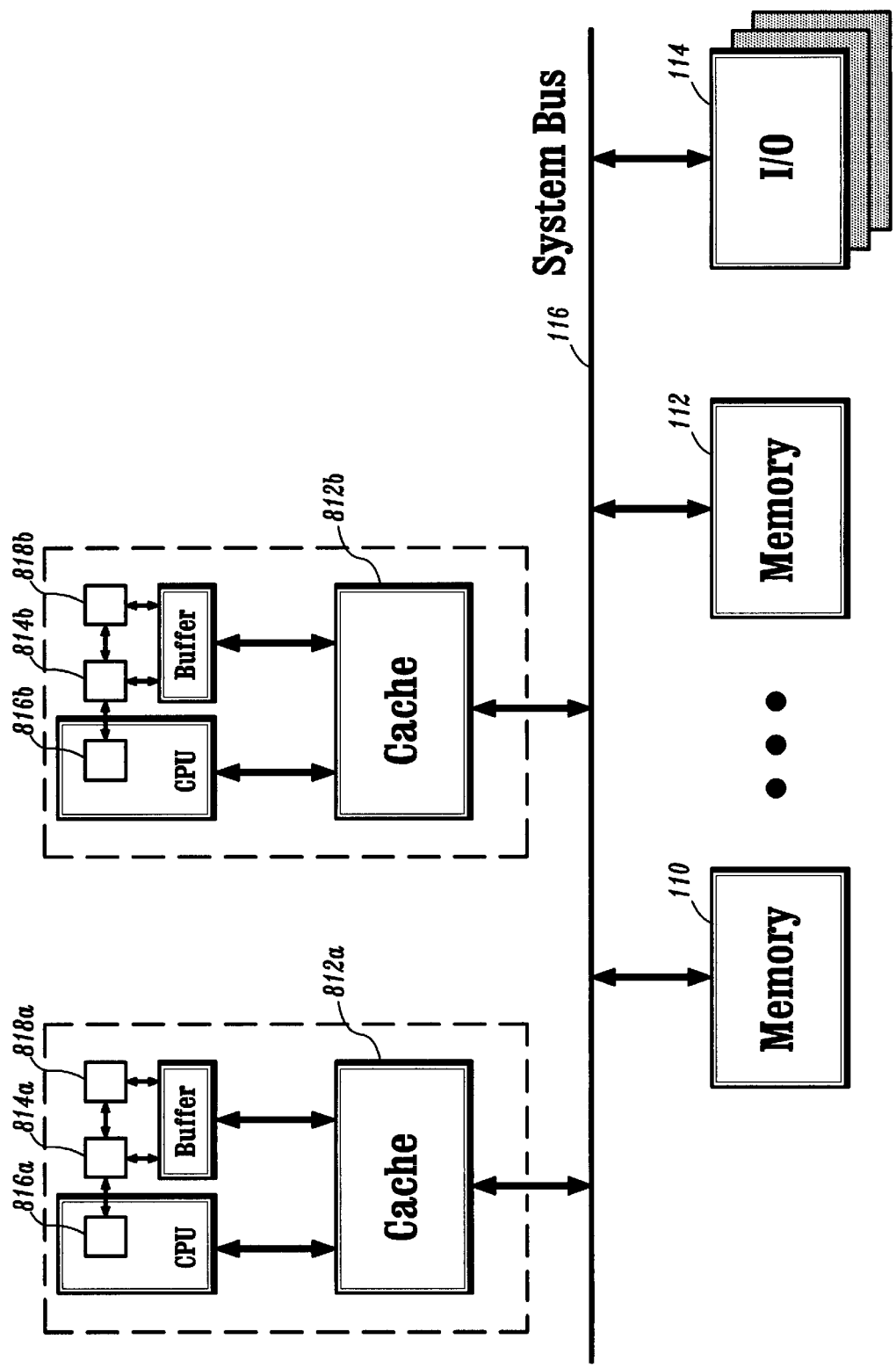
FIG. 8 is a diagram of a multiprocessor computer system that includes an apparatus for reordering and renaming memory references according to an illustrative embodiment of the present invention.

FIG. 8 is a diagram of a multiprocessor computer system that includes an apparatus for reordering and renaming memory references according to an illustrative embodiment of the present invention. The system 800 includes a processor 102, a processor 106, a main memory 110, a main memory 112, and input/output (I/O) devices 114. The components of system are all operatively coupled to each other through system bus 116. I/O 114 collectively refers to I/O adapters (e.g., video card) and the I/O devices (e.g., monitor) operatively coupled thereto. Main memory 110 and main memory 112 are shared between the processors.

The apparatus includes a plurality of buffers 810*a–b*. Each buffer corresponds to one of the processors. In the embodiment of FIG. 8, buffer 810*a* corresponds to processor 102, and buffer 810*b* corresponds to processor 106. Moreover, each buffer is adapted to store a datum when a corresponding processor receives a gated store request to store the datum, and to provide a particular datum to the corresponding processor from among the stored data based on an in-order sequence of load and store operations when a load request is received from the corresponding processor to load the particular datum.

The apparatus further includes a plurality of private caches 812*a–b*. Each cache corresponds to one of the processors. In the embodiment of FIG. 8, cache 104 corresponds to processor 102, and cache 108 corresponds to processor 106. Moreover, each cache is adapted to exclusively acquire a cache line containing the datum when the corresponding processor receives the gated store request to store the datum.

The processor 102, private cache 812*a*, and buffer 810*a* comprise a node 803 of system 100. The processor 106, private cache 812*b*, and buffer 810*b* comprise a node 807 of system 800.

The apparatus also includes an indicator 814 adapted to indicate an error condition when a load request for a given datum corresponds to the data in one of the plurality of buffers 810*a–b*. The load request for the given datum is received by the cache of the processor corresponding to the buffer containing the given datum. Thus, if buffer 810*a*, which corresponds to processor 102 in the above example, contains the given datum, then the load request for the given datum is received by cache 104 of processor 102. The load request for the given datum is provided from the non-corresponding processor. Thus, to continue the example, the load for the given datum would be received from processor 106.

The apparatus additionally includes a reset device 816 adapted to reset a current state of at least one of the processors to an earlier state when the load request for the given datum corresponds to the data in one of the plurality of buffers 810*a–b* (buffer 810*a* in the above example).

Optionally, the apparatus may further include commitment logic 818*a–b* adapted to commit at least some of the data in the buffers to an architected memory state of the computer system to remove the at least some of the data from the buffers. If the commitment logic 818*a–b* is included in the apparatus, then the indicator 814*a–b* indicates the error condition only when the given datum is not committed. Given the teachings of the present invention provided herein, one of ordinary skill in the related art will be able to contemplate these and similar implementations of the elements of the invention.

A description of various optimizations and alternate embodiments of the present invention will now be given. For example, the reordering and renaming of operations can occur dynamically, or statically, at runtime or compile time, by hardware or software, and can optionally include a binary translation step.

In response to a rollback event, operation can either be restarted based on hardware execution, or using specially tailored repair functions to minimize conflicts.

In an optimized embodiment of the present invention, a mechanism selects whether to perform a rollback of the processor owning the cache line (as in the first illustrative embodiment), or of the processor requesting the cache line (as in the second illustrative embodiment), or of both processors. The selection criterion can be randomly generated, or based on a protocol to balance forward progress between multiple processors, e.g., round-robin.

In another optimization, the memory locations held in the MRRB can be committed in a "lazy" manner, i.e., only when a request for a memory location is received.

In yet another optimized embodiment, a processor receiving a cross-interrogate may be allowed to execute for a maximum predetermined number of cycles if a match is found in the MRRB. This may allow the processor to commit the value to memory, thereby eliminating the need to perform an expensive rollback operation.

In still another optimized embodiment, a response to a cross-interrogate request can be deferred without time limit until the requested memory location is ready to be committed to memory, if it can be established that doing so does not create a deadlock (e.g., if the other processor does not maintain any values in its MRRB or does not implement an MRRB).

In a further optimized embodiment, one or more processors enter a mode where memory requests are processed in-order without use of the MRRB to reduce the occurrence of rollback events. This mode transition may be caused by passing a threshold of rollback events, whereupon serial processing of memory operations is initiated. Depending on the implementation, memory reordering and renaming is restarted automatically by the hardware, or by the intervention of software (e.g., the operating system after a scheduling step to avoid further MRRB conflicts and rollbacks.)

In still a further optimized embodiment, counters determine the number of MRRB rollback events to guide the operating system to schedule processes onto different processors so as to minimize conflicts between processors.

In yet still a further optimized embodiment, no rollback is performed in response to a speculative load. Instead, one of a number of possible values (such as the value stored in the main memory, or the value stored by an MRRB) is returned in response to a speculative load. Later disambiguation then reads an authoritative value and performs appropriate repair actions. Such disambiguation may include, for example, a load-verify operation as described in U.S. Pat. No. 5,758,051, entitled "Method and Apparatus for Reordering Memory Operations in a Processor", issued on May 26, 1998, assigned to the assignee herein, the disclosure of which is incorporated herein by reference.

The memory model implemented by the present invention ensures that loads and stores are consistent with respect to any given memory location, and in-order with respect to the memory subsystem. Store operations to different addresses may appear to be out-of-order at other processors. In an optimized embodiment, a total ordering of store operations can be achieved by requesting the memory locations in the original order of operations.

In another optimized embodiment, the register renaming buffer and memory reorder (MRRB) and the rename buffer may be implemented as a single unit. Moreover, the memory reorder and rename buffer (MRRB) may be implemented using a gated store buffer.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for reordering and renaming memory references in a multiprocessor computer system having at least a first and a second processor, the first processor having a first private cache and a first buffer, the second processor having a second private cache and a second buffer, said method comprising the steps of:

for each of a plurality of gated store requests received by the first processor to store a datum,
exclusively acquiring a cache line that contains the datum by the first private cache, and
storing the datum in the first buffer;

upon the first buffer receiving a load request from the first processor to load a particular datum,
providing the particular datum to the first processor from among the data stored in the first buffer based on an in-order sequence of load and store operations; and upon the first cache receiving a load request from the second cache for a given datum,
indicating an error condition and resetting a current state of at least one of the processors to an earlier state when the load request for the given datum corresponds to the data stored in the first buffer.

2. The method according to claim 1, further comprising the step of committing at least some of the data in the first buffer to an architected memory state of the computer system, prior to said indicating step, to remove the at least some of the data from the first buffer, and wherein said indicating step is performed only when the given datum in the first buffer is not committed.

3. The method according to claim 2, wherein said committing step commits a specified datum to the architected memory state of the computer system when a gated store request corresponding to the specified datum is in-order with respect to all instructions that precede the gated store request.

4. The method according to claim 1, wherein said resetting step comprises the step of discarding at least some of the data in the first buffer.

5. The method according to claim 1, wherein said resetting step comprises the step of discarding the given datum from the first buffer and all data stored thereafter.

6. The method according to claim 1, further comprising the step of releasing the cache line when operations referring to the cache line have completed execution in-order.

7. The method according to claim 1, further comprising the step of releasing the cache line, when the datum contained within the cache line is committed to an architected memory state of the computer system in-order or when the datum is discarded from the first buffer.

8. The method according to claim 1, wherein the earlier state corresponds to an operation immediately preceding the gated store request that stored the given datum in the first buffer.

9. The method according to claim 1, further comprising the step of generating a snapshot of the earlier state.

10. The method according to claim 9, wherein said generating step comprises one of the steps of copying contents of registers corresponding to the earlier state, and maintaining a record of incremental state changes from at least one state preceding the earlier state up to the earlier state.

11. The method according to claim 1, further comprising the step of storing a snapshot of the earlier state in the first buffer.

12. The method according to claim 1, further comprising the steps of:
storing a snapshot of the earlier state in one of the first processor, the second processor, and a storage device external thereto; and
storing a timestamp corresponding to the snapshot of the earlier state in the first buffer in association with the given datum.

13. The method according to claim 12, wherein said resetting step comprises the step of searching for the timestamp in the first buffer to identify the snapshot from among a plurality of snapshots stored in one of the first processor, the second processor, and the storage device external thereto.

14. The method according to claim 1, further comprising the step of processing the store and load requests in-order and suspending said steps involving the first buffer, upon performing a predetermined number of resetting steps.

15. The method according to claim 1, further comprising the steps of:

when the load request is a speculative load request:
suspending said indicating and resetting steps;
providing, to the second cache in response to the load request, a specified datum from among the data stored in at least one the first buffer, the second buffer, and a main memory of the computer system that is shared between the processors; and
providing an authoritative datum to the second cache and performing corresponding repair operations with respect to the specified datum previously provided to the second cache, upon disambiguation of the speculative load request.

16. The method according to claim 15, further comprising the steps of:
determining whether the authoritative datum is the specified datum; and
resetting a processor in-order state and performing repair actions, when the authoritative datum is the specified datum.

17. An apparatus for reordering and renaming memory references in a multiprocessor computer system having a plurality of processors, comprising:
a plurality of buffers, each buffer corresponding to one of the processors, and adapted to store a datum when a corresponding processor receives a gated store request to store the datum, and to provide a particular datum to the corresponding processor from among the stored data based on an in-order sequence of load and store operations when a load request is received from the corresponding processor to load the particular datum;
a plurality of private caches, each cache corresponding to one of the processors, and adapted to exclusively acquire a cache line containing the datum when the corresponding processor receives the gated store request to store the datum;
an indicator adapted to indicate an error condition when a load request for a given datum corresponds to the data in one of the plurality of buffers, the load request received by the cache of the processor corresponding to the one of the plurality of buffers; and
a reset device adapted to reset a current state of at least one of the processors to an earlier state when the load request for the given datum corresponds to the data in the one of the plurality of buffers.

18. The apparatus according to claim 17, further comprising commitment logic adapted to commit at least some of the data in the buffers to an architected memory state of the computer system to remove the at least some of the data from the buffers, and wherein said indicator indicates the error condition only when the given datum is not committed.

19. The apparatus according to claim 18, wherein said commitment logic commits the given datum to the architected memory state of the computer system when a given gated store request corresponding to the given datum is in-order with respect to all instructions that precede the given gated store request.

20. The apparatus according to claim 17, wherein said reset device is further adapted to discard at least some of the data in the buffers.

21. The apparatus according to claim 17, wherein said reset device is further adapted to discard the given datum from the one of the plurality of buffers and all data stored thereafter.

22. The apparatus according to claim 17, wherein each cache is further adapted to release the cache line when operations referring to the cache line have completed execution in-order.

23. The apparatus according to claim 17, wherein each cache is further adapted to release the cache line, when the datum contained within the cache line is committed to an architected memory state of the computer system in-order or when the datum is discarded from one of the buffers.

24. The apparatus according to claim 17, wherein the earlier state corresponds to an operation immediately preceding the gated store request that stored the given datum in one of the buffers.

25. The apparatus according to claim 17, wherein each of the buffers is further adapted to store a snapshot of the earlier state.

* * * * *